(12) United States Patent
Obaidi et al.

(10) Patent No.: US 10,880,333 B2
(45) Date of Patent: *Dec. 29, 2020

(54) TRUST POLICY FOR TELECOMMUNICATIONS DEVICE

(71) Applicant: T-Mobile USA, Inc., Bellevue, WA (US)

(72) Inventors: Ahmad Arash Obaidi, Issaquah, WA (US); Eric W. Yocam, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,364

(22) Filed: May 9, 2019

(65) Prior Publication Data

US 2019/0268380 A1  Aug. 29, 2019

Related U.S. Application Data

(63) Continuation of application No. 14/794,606, filed on Jul. 8, 2015, now Pat. No. 10,298,617.

(51) Int. Cl.
*H04L 29/06* (2006.01)
*H04W 12/08* (2009.01)

(52) U.S. Cl.
CPC ............ *H04L 63/20* (2013.01); *H04L 63/102* (2013.01); *H04W 12/0804* (2019.01)

(58) Field of Classification Search
CPC ....... H04L 63/20; H04L 63/102; H04W 12/08
See application file for complete search history.

(56) References Cited

U.S. PATENT DOCUMENTS 9,069,436 B1   6/2015 Fieweger et al.
9,294,456 B1   3/2016 Timmermans
(Continued)

OTHER PUBLICATIONS

Office action for U.S. Appl. No. 14/794,606, dated Aug. 14, 2017, Obaidi et al., "Trust Policy for Telecommunications Device", 34 pages.
(Continued)

*Primary Examiner* — Mohammed Waliullah
(74) *Attorney, Agent, or Firm* — Lee & Hayes, P.C.

(57) ABSTRACT

Systems and processes that may be implemented to manage access by software applications to various resources of a user telecommunications device are disclosed. The systems and processes may implement a trust policy which reflects privacy criteria selected by a user of the user telecommunications device, wherein the trust policy overrides registered permissions of the software applications. The user telecommunication device may include a memory that stores a software application has been granted registered permissions to access a input and/or output component of the user telecommunications device as well as a trust policy has been set by the user to proscribe access by that particular software application to the input and/or output component. In implementing the trust policy, the software application may be prevented from accessing the input and/or output component notwithstanding the software application having registered permissions to access the input and/or output component.

20 Claims, 6 Drawing Sheets

(56) References Cited

U.S. PATENT DOCUMENTS

| | | | |
|---|---|---|---|
| 2001/0045983 A1 | 11/2001 | Okazaki et al. | |
| 2002/0031230 A1 | 3/2002 | Sweet et al. | |
| 2004/0010701 A1 | 1/2004 | Umebayashi et al. | |
| 2005/0144476 A1* | 6/2005 | England | G06F 21/575 726/17 |
| 2005/0149948 A1* | 7/2005 | Gupta | H04L 43/0817 719/321 |
| 2006/0172777 A1 | 8/2006 | Klein et al. | |
| 2006/0242077 A1 | 10/2006 | Dettinger et al. | |
| 2006/0288404 A1* | 12/2006 | Kirshnan | G06F 8/656 726/5 |
| 2007/0130624 A1* | 6/2007 | Shah | G06F 21/566 726/24 |
| 2007/0169129 A1* | 7/2007 | Polivy | G06F 9/44505 719/327 |
| 2007/0192828 A1 | 8/2007 | Messina et al. | |
| 2007/0266421 A1 | 11/2007 | Vaidya et al. | |
| 2009/0099967 A1 | 4/2009 | Yokota et al. | |
| 2010/0257035 A1 | 10/2010 | Karmon et al. | |
| 2011/0112668 A1 | 5/2011 | Sorensen et al. | |
| 2012/0110039 A1 | 5/2012 | McKay et al. | |
| 2012/0255021 A1* | 10/2012 | Sallam | G06F 21/564 726/25 |
| 2012/0255025 A1 | 10/2012 | Roshchin | |
| 2013/0110675 A1 | 5/2013 | Bouw | |
| 2013/0326375 A1 | 12/2013 | Barak et al. | |
| 2014/0195626 A1 | 7/2014 | Ruff et al. | |
| 2014/0289794 A1* | 9/2014 | Raleigh | G06F 21/575 726/1 |
| 2014/0337918 A1* | 11/2014 | Siddiqi | G06F 21/56 726/3 |
| 2014/0359306 A1 | 12/2014 | Sasao et al. | |
| 2015/0172747 A1 | 6/2015 | Huang et al. | |
| 2015/0317398 A1 | 11/2015 | Phillips | |
| 2016/0294832 A1* | 10/2016 | Pathak | H04L 63/101 |
| 2019/0266330 A1* | 8/2019 | Thaler, III | H04L 63/0227 |

OTHER PUBLICATIONS

Office action for U.S. Appl. No. 14/794,606, dated Jan. 11, 2018, Obaidi et al., "Trust Policy for Telecommunications Device", 31 pages.

Office action for U.S. Appl. No. 14/794,606, dated Oct. 20, 2016, Obaidi et al., "Trust Policy for Telecommunications Device", 29 pages.

Office action for U.S. Appl. No. 14/794,606, dated Mar. 13, 2017, Obaidi et al., "Trust Policy for Telecommunications Device", 32 pages.

Office action for U.S. Appl. No. 14/794,606, dated Aug. 7, 2018, Obaidi et al., "Trust Policy for Telecommunications Device", 25 pages.

\* cited by examiner

US 10,880,333 B2

TRUST POLICY FOR TELECOMMUNICATIONS DEVICE

PRIORITY

This application is a continuation of, and claims priority to, U.S. patent application Ser. No. 14/794,606, entitled "TRUST POLICY FOR TELECOMMUNICATIONS DEVICE", filed on Jul. 8, 2015, which is fully incorporated herein by reference in its entirety.

BACKGROUND

Modern telecommunications devices are becoming increasingly ubiquitous. This has lead users of telecommunications devices to become increasingly complacent with the presence of such devices at nearly all times during one's daily routine. Such telecommunication devices include traditional desktop and laptop computers as well as smaller devices that are typically carried on a user's person such as smart phones and now even wearable devices such as Internet-connected watches.

As the prevalence of telecommunications devices increases, so do opportunities to exploit such devices to harvest data associated with device users. Many device users are at least generally aware that various sources may harvest data regarding how devices are actively used such as, for example, an online-retailer saving data related to a user's search history to later use the harvested data to perform targeted advertising based on the harvested data. However, even savvy device users may be unaware that various sources may also harvest data while devices are being passively used. For example, an application that a user has installed on a smartphone may be programmed to access a microphone or camera of the smartphone while the phone is not being actively used but rather is sitting on a coffee table while the user watches television. In some cases, the user may have agreed to the application accessing the hardware in an end user license agreement (EULA) despite not having read the EULA. In contrast, some applications are designed to operate covertly such that the user may never even know that the application has been installed onto the device. Accordingly, it may be tedious, or even impracticable, for a typical telecommunications device user to fully understand and monitor the channels through which various device resources may be exploited by applications to harvest data.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes various systems and processes that may be implemented to manage access by software applications to various resources of a user telecommunications device. In particular, the systems and processes may implement a trust policy which reflects privacy criteria selected by a user of the user telecommunications device, wherein the trust policy overrides registered permissions of the software applications. For example, in the event that a particular software application has been granted registered permissions to access an input component of the user telecommunications device while a trust policy has been set by the user to proscribe access by that particular software application to the input component, the software application may be prevented from accessing the input component. These systems and processes, which are described further herein, can prevent applications from harvesting data unbeknownst to a user of a telecommunications device by providing a consolidated user interface, e.g. a trust policy management interface, through which a trust policy can be set and implemented without a user having to continuously monitor registered permissions that may fluctuate as applications are installed and/or updated. It should be understood that although the disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results.

Figure 1:
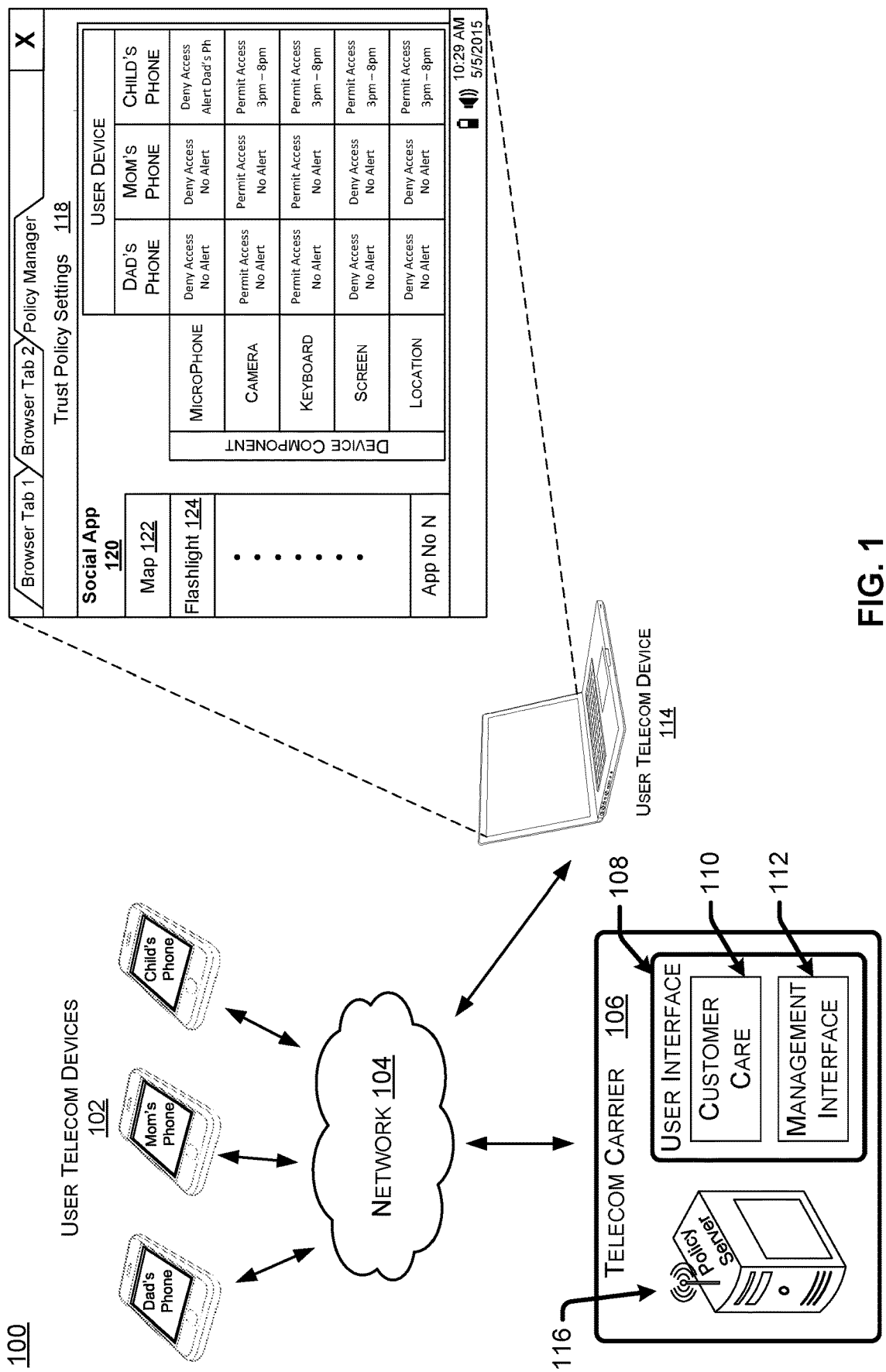
FIG. 1 illustrates an overview of a telecommunication system/network for implementing a trust policy to manage access by one or more applications to various resources of one or more user telecommunication devices, in accordance with various implementations of the disclosure.

FIG. 1 illustrates an overview of a telecommunication system/network 100 for implementing a trust policy to manage access by one or more applications to various resources of one or more user telecommunication devices 102. The user telecommunication devices 102 may be connected to a network 104 which may be representative of a local area network (LAN) or the world-wide web. Further, system 100 may include a telecommunications carrier 106 that provides services, e.g. cellular service and/or internet connectivity services, to the telecommunication devices 102. The telecommunication carrier 106 may also include a user interface 108 that enables a telecommunication device user, e.g. a cell phone plan subscriber, to communicate with the telecommunication carrier 106 and optionally make changes to the user's current telecommunication plan. The user interface 108 may include a customer care center 110 for a user to call into and speak directly with a customer service representative of the telecommunication carrier 106 in an attempt modify one or more settings of a telecommunication plan including but not limited to one or more privacy criteria of a trust policy. The user interface may also include a trust policy management interface 112 for receiving user input for updating settings of the telecommunication plan including, but not limited to, the trust policy. In some embodiments, the trust policy management interface 112 may optionally be accessed through an application installed one or more of the telecommunication devices 102 or, alternatively, a web portal may be provided to a user telecommunication device 114.

It should be appreciated that telecommunication system 100 of FIG. 1 is intended to depict a simplified representation of a telecommunication network that can employ any mixture of 2G, 3G, and 4G access technologies, which are commonly utilized in a real-world, heterogeneous telecommunication network. It should also be appreciated that the telecommunication system 100 could be configured to employ any combination of common wireless broadband communication technologies, including, but not limited to, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, or WiFi® technology. Furthermore, it should be understood that the user telecommunication devices 102 and 114 may be representative of any number of common communication devices, including cellular phones, tablet computers, electronic book devices, handheld gaming units, personal media players, etc., which can be connected to the network 104 utilizing any common wireless or wireline network access technology. Further, the user telecommunication devices 102 and 114 may be configured to run any known operating system, including but not limited to, Microsoft Windows Mobile®, Microsoft Windows 8.1®, Google Android®, Apple iOS®, Linux Mobile®, or any other common mobile device or personal computer operating system. These diverse communication technologies, device types, and operating systems are neither depicted nor described within the context of the telecommunication system 100 of FIG. 1, for the sake of brevity.

In an implementation, the telecommunication carrier 106 may include, but is not limited to, a policy server/trust policy server 116 for storing data associated with one or more trust policies reflecting privacy criteria that may be selected by a user(s) of telecommunication device(s) 102. In a scenario where the telecommunication carrier 106 provides telecommunication service to the user telecommunication devices 102, the trust policy server 116 may communicate, via the network 104, with the telecommunication devices 102 to provide a trust policy or update an existing trust policy based on user input. For example, a user may access the trust policy management interface 112 via a web portal 118 on the user device 114. The web portal 118 may enable the user to modify one or more rules for managing access to at least one of an input component or an output component of the user telecommunication devices 102. For example, as seen at the web portal 118, a trust policy may include one or more rules (a.k.a. trust policy rules) for managing access permissions of an application, e.g. Social App, to various components of the telecommunication devices 102. In the illustrated embodiment, which is for example only and is not intended to be limiting, trust policy rules are organized in a simple table format with rows representing device components and columns specifying user devices. Furthermore, it should be appreciated that only those rules associated with Social App 120 are displayed, and that to view rules associated with another application, e.g. Map 122 or Flashlight 124, a user would simply click on the corresponding tab.

In various implementations, exemplary trust policy rules include, but are not limited to, granting a specific application that is installed onto one or more of the user telecommunication devices 102 access to some device components while proscribing access to other device components. For example, an application entitled Social App 120 may be installed onto one or more of the telecommunication devices 102 including a Dad's Phone, a Mom's Phone, and their Child's Phone. In accordance with the illustrated embodiment, each of the telecommunication devices 102 may include components including, but not limited to, a microphone, a camera, a keyboard (which may be a touchscreen with a keyboard displayed thereon), a screen (e.g. a graphical user interface), and a location determining component such as a GPS module. Referring particularly to the illustrated trust policy rules governing the ability of Social App 120 to access the enumerated components of Dad's Phone, web portal 118 indicates that Social App 120 is to be denied access to the microphone and the location determining component of Dad's Phone. For example, in the event that Social App 120 attempts to access either one of the microphone or the location determining component, e.g. by issuing an application programming interface (API) call to access the microphone, Social App may be denied access. Accordingly, Social App 120 may be prevented from eavesdropping on conversations that dad may have either during a telephone call or simply while Dad's Phone is in close proximity to him while he is speaking with a third-party. As will be discussed in more detail below, in the illustrated embodiment Social App 120 may be denied access regardless of whether Social App 120 has registered permissions to access the microphone of Dad's Phone.

Furthermore, web portal 118 indicates that Social App 120 may be permitted access to other components (e.g. a camera, a keyboard, and a screen); however, such access may be contingent on one or more other criteria. For example, the telecommunication devices 102 may also deny access of an application to various components based upon registered permissions of the operating system indicating that the application lacks registered permissions for a particular type of access. In some implementations, the trust policy (and rules thereof) override registered permissions entirely such that in the event that an application does have registered permissions to access a component, e.g. a microphone, but the trust policy proscribes such access, the application will be prevented from accessing the component. In contrast, in an implementation wherein the trust policy entirely overrides registered permissions, in the event that an application does not have registered permissions to access the component but the trust policy is set to enable access, the application may still be granted access based on the trust policy. For example, registered permissions may be updated to according to the trust policy as set by the user.

In some implementations, the trust policy rules may be set to differ across different user telecommunication devices 102 and/or different applications 120 & 124. For example, while one or more trust policy rules for a particular device may deny Social App 120 access to the location determining component, the trust policy for that device may include other trust rules which allow the Map Application 122 to access the location determining component. Although the user may select privacy criteria for any number of reasons based on individual preferences, the forgoing example illustrates selectively permitting access in accordance with least privileges security principles. In particular, the Map App 122 may be programmed to provide real time driving directions to a user which requires monitoring the user's real time location. Accordingly, the Map App 122 may be unable to perform this core function without accessing the location determining component. In contrast, the core functions of Social App 120 and/or Flashlight App 124 may be wholly unrelated to the user's current location and, accordingly, Apps 120 and 124 may perform all core functionality without accessing the location determining component and, therefore, may have trust policy rules set to proscribe such access.

In some implementations, the trust policy rules may be set to differ across different user telecommunication devices 102. For example, web portal 118 indicates that while the trust policy rules for Dad's Phone and Mom's Phone are identical, a user has selected alternative trust policy rules for Child's Phone. In particular, pursuant to the trust policy of the current example, Social App 120 is permitted to access the location determining component of Child's Phone between the hours of 3 pm and 8 pm. Furthermore, in the event that Social App 120 attempts to access the microphone component of Child's Phone, the trust policy is set not only to deny the access attempt but to also to send a notification/ alert to Dad's Phone which provides specific details of the attempt. Such an implementation may be desirable for users who wish to be alerted when an application attempts to access any particular input component or output component. It should be appreciated that although a temporal limitation has only been provided with regard to the time of day, other rules may also be created/defined by the users. For example, a trust policy rule may be set to allow an Application, e.g. Social App 120, to operate at any time on a weekend day up to a total operation time limit, e.g. 2 hours only until Social App 120 is denied access to all components of the Child's device rendering Social App 120 inoperable.

In various implementations, the trust policy management interface 112 in configured to verify an authority to update the trust policy rules prior to enabling the rules to be modified. For example, in the implementation illustrated in FIG. 1 the mother may be the only user for the particular family plan who is authorized to update trust policy settings. Accordingly, the web portal may require the mother to log in using a username and password prior to being enabled to update policy rules. In other implementations, there may be multiple users with administrative authority such as, for example, several IT staff professionals charged with managing all user devices of a large organization.

It should be appreciated that modern telecommunications devices may contain many more input components or output components than those shown in the web portal 118 and that it is within the scope of the present disclosure to implement the trust policy in relation to any such component whether currently existing or subsequently developed. It should further be appreciated that the trust policy may be stored on the memory of any individual user telecommunication device 102 or may be stored on the trust policy server 116 and periodically pushed to, or pulled from, the use telecommunication devices 102 (such as via an over-the-air network connection).

Figure 2:
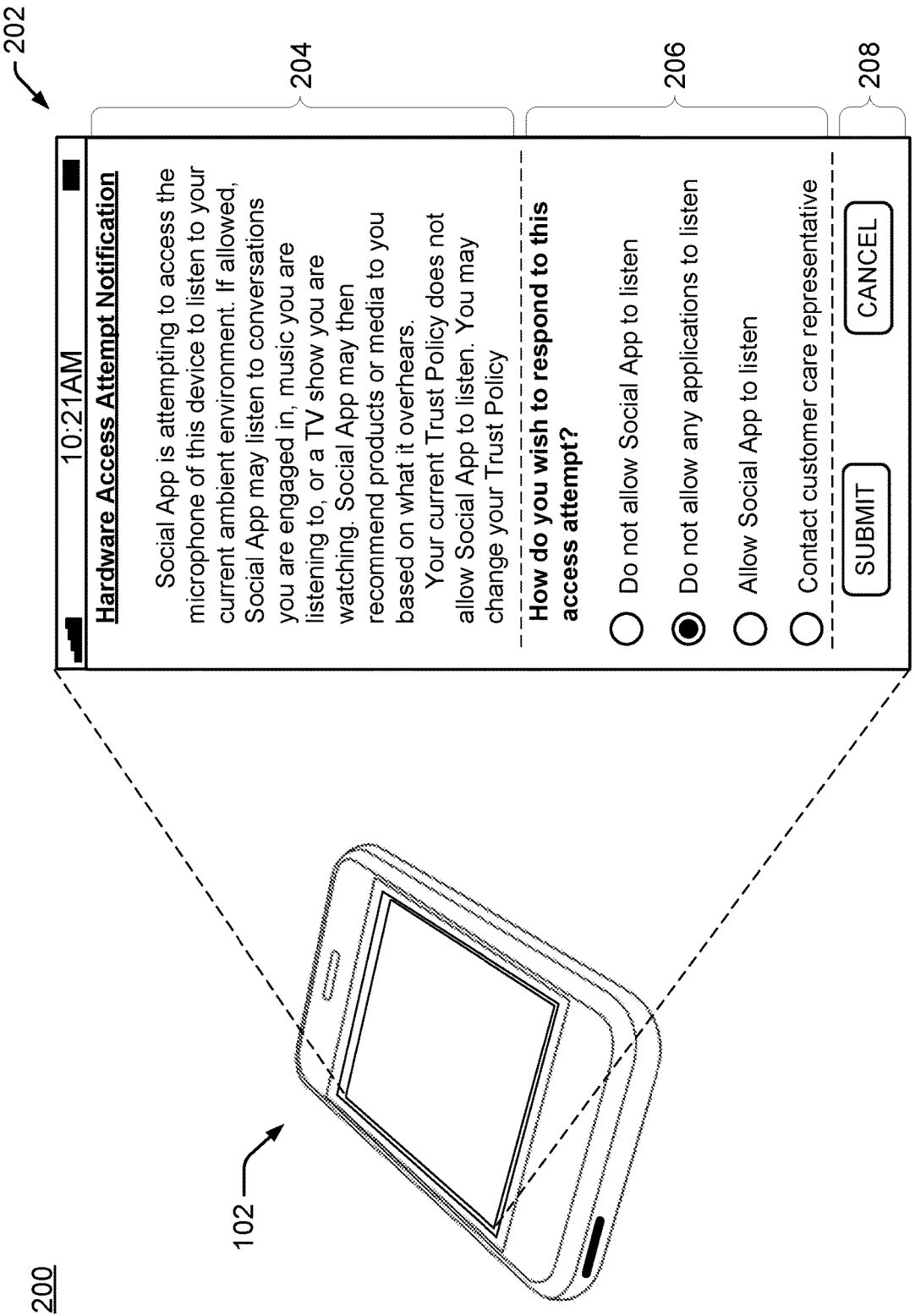
FIG. 2 depicts a telecommunication device user interface indicating that an application has attempted to access a device resource which a trust policy does not permit the application to access, in accordance with various implementations of the disclosure.

FIG. 2 depicts a user telecommunication device 102 user interface 202 indicating that an application (e.g. Social App 120) has attempted to access a device component which a trust policy does not permit the application to access, in accordance with various implementations of the disclosure. In some implementations, when a user telecommunication device 102 detects an attempt to access a resource and determines that the access would violate one or more trust policy rules, an access attempt notification 204 may be displayed on the user telecommunication device 102. In certain scenarios, the access attempt notification 204 may include detailed information regarding the particular attempt to access a resource. For example, in the illustrated example the access attempt notification 204 may include at least one of: an indication of which application has attempted to access a device component, e.g. Social App 120; an indication of which component the application has attempted to access, e.g. the microphone; an description of potential drawbacks associated with the type of access attempted, e.g. privacy concerns of Social App 120 listening to the user without the user's knowledge; a description of potential benefits associated with the type of access attempted, e.g. increased relevance of product advertisements and/or music suggestions; and an indication of the current trust policy settings, e.g. currently the trust policy does not allow the requested access.

Additionally, the access attempt notification 204 may provide one or more selectable options 206 for managing the trust policy in view of the current access attempt. In some situations these options 206 may include, but are not limited to, an option to maintain the current trust policy (e.g. "Do not allow Social App to listen"), an option to update the current trust policy to further restrict other applications (e.g. "Do not allow any applications to listen"), an option to update the current trust policy to permit the current request (e.g. "Allow Social App to listen"), and an option to contact a customer care representative (e.g. for further explanation of the meaning of the notification). In some implementations, the access attempt notification 204 may be configured to indicate that an application (e.g. Social App 120) has attempted to access a device component even though the trust policy permits the access. For example, even though Social App 120 may be permitted, by the trust policy, to access the microphone, the access attempt notification 204 may display an alternate message, e.g. "Social App is currently accessing the microphone of this device. Social App may now be 'listening' to conversations you are engaged in, music you are listening to, etc.). Such an implementation may be preferred by a privacy conscious user who has tentatively agreed to allow an application a particular type of access but wishes to be apprised as to the extent to which the access is being utilized by the application.

In some implementations, when an option has been selected from the one or more selectable options 206 an affected telecommunication device user may select to "Submit" their selection to the telecommunication carrier via a command selection area 208 of the user interface 202. Alternatively, the user can select to end the access attempt notification 204 by selecting the "Cancel" option from the command selection area 208. It should be appreciated that, as with all illustrations provided herein, the illustrated implementation of FIG. 2 is provided for explanatory purposes only and shall not be construed to limit the scope of the disclosure.

Figure 3:
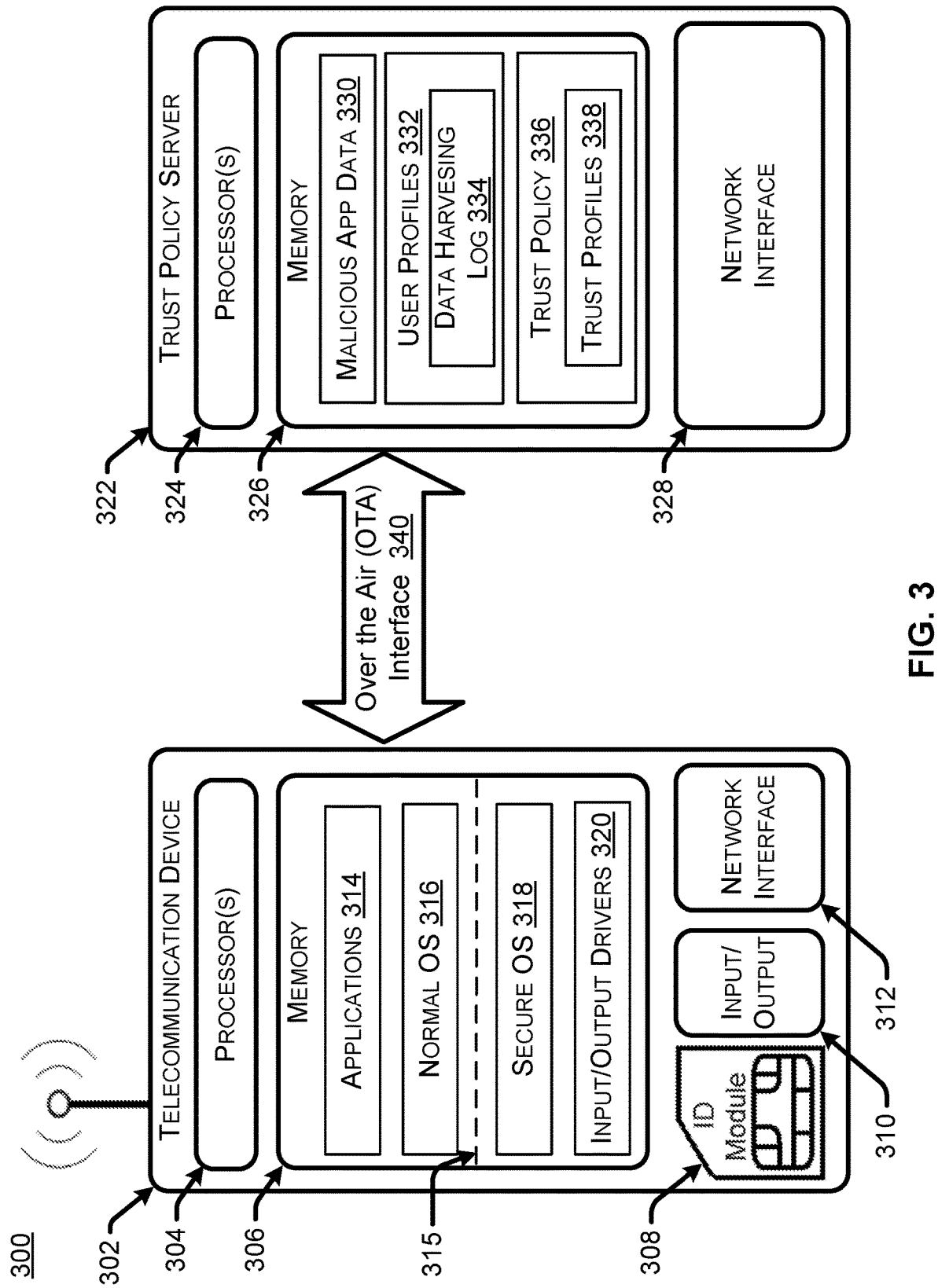
FIG. 3 is an example hardware platform employed in implementing a trust policy for managing application access to device resources, in accordance with embodiments of the disclosure.

FIG. 3 depicts a multi-device hardware platform 300 including a user telecommunication device 302 having a secure operating system (OS) 318 employed in implementing a trust policy 336 for managing application access to device resources, in accordance with embodiments of the disclosure. Similar to that which was discussed above for the user telecommunication devices 102 of FIG. 1, the user telecommunication device 302 with the secure OS 318 of FIG. 3, may be representative of various user telecommunication devices such as, for example, those described in relation to FIG. 1. Furthermore, the trust policy server 322 may be representative trust policy server 116 of the telecom carrier 106 of FIG. 1. In an embodiment, the user telecommunication device 302 may include, but is not limited to, one or more processor(s) 304, a memory 306 storing various software applications 314, a normal operating system (OS) 316, as well as an identification module 308, a network interface 312. In an embodiment, the memory 306 may include a secure OS 318 for securely operating one or more input components and/or output component drivers 320 (hereinafter input/output drivers 320) to receive data from or transmit data to one or more input components and/or output components 310 (hereinafter input/output components 310). The secure OS 318 may optionally be separated from the normal OS 316 by one or more partitions 315 on the memory 306.

Although not explicitly depicted in FIG. 3, each of the one or more processor(s) 304, can include at least a central processing unit (CPU) having numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 304 may also be responsible for executing all computer applications 314 stored in the user telecommunication device's 302 memory 306, which can be associated with common types of volatile (RAM) and/or nonvolatile (ROM) memory.

In some scenarios, the ID module 308 of the user telecommunication device 302 can indicate a customer account, maintained by a telecommunication carrier entity, as being associated with a particular trust profile including one or more trust policy rules having been customized by an account administer, e.g. a telecommunication device user having permission to modify the trust policy via the trust policy management interface 112 for receiving user input for updating the trust policy rules. Further, the network interface 312 of the user telecommunication device 302 may include one or more device transceivers, and optionally, one or more device transcoders, such that the user device 302 can communicate (transmit and receive) data between itself and the trust policy server 322 of its telecommunication carrier entity via an over-the-air OTA interface 340.

In an embodiment, the trust policy server 322 of an affiliated telecommunication carrier may include, but is not limited to, one or more processor(s) 324, a memory 326 storing trust policy rules 336 which may include one or more unique trust profiles 338, user/subscriber profiles 332 which may be associated with a data harvesting log 334, as well as data regarding known malicious applications 330. In some embodiments, the trust policy server 322 further includes a network interface 328 enabling the trust policy server 322 to communicate with one or more user device(s) 302 using the OTA interface 340.

Each of the one or more processor(s) 324 of the trust policy server 322 may include a CPU having numerous ALUs that perform arithmetic and logical operations, as well as one or more CUs that extract instructions and stored content from processor cache memory and then executes these instructions by calling on the ALUs, as necessary, during program execution. The processor(s) 324 may also responsible for executing all computer programs, and retrieving all data, stored in the server's 322 memory 326, which may be associated with any common type of volatile (RAM) and/or nonvolatile (ROM) memory.

In an embodiment, the malicious application data 330 stored in the memory 326 of the trust policy server 322 may include information associated with applications which are flagged as being malicious data harvesting applications. In some embodiments, the malicious application data 330 may list applications which are known to attempt to access the input/output components 310 in a manner that is unnecessary to perform purported core functions of the applications and/or in manner that is intentionally unbeknownst to a user. For example, a user may download an application purporting to be a "Flashlight App" with the sole purported core function of turning on a camera flash, e.g. an output component, for an extended period of time. However, the "Flashlight App" may subsequently attempt to access a microphone input component in an attempt to harvest data associated with the user. Accordingly, data regarding the "Flashlight App" may be listed in the malicious application data 330 for later use such as, for example, to detect that a user has selected the "Flashlight App" to download onto the memory 306 and, in response thereto, notifying the user of the known privacy concerns regarding the "Flashlight App." In some embodiments, the malicious application data 330 includes information regarding applications which are designed to operate entirely unbeknownst to the user. For example, various espionage oriented malware applications are designed to secretly cause themselves to be downloaded and then to operate entirely in the background without disrupting a user experience of operating the device. Any other type of relevant malicious application data may also be stored.

In an embodiment, user/subscriber profiles 332 may correspond to data associated with the ID module 308 of the user device 302. Accordingly, the user profiles 332 can contain one or more data harvesting logs 334 that include information relating to data that has been previously harvested from the input/output components 310 by one of more of the applications 314. For example, the data harvesting log 334 may log each time an application accesses an input/output component 310. The log 334 may indicate the particular application that accessed (or merely attempted to access) a particular input/output component as well as the particular time period during which the access occurred. For example, the data harvesting log 334 may indicate that on May 11, 2015, from 5 pm until 5:50 pm the microphone of the telecommunication device 302 was accessed by Social App 120. In some embodiments, at least a portion of data that is harvested by an application 314 is stored in the data harvesting log 334. Accordingly, in some implementations a user may be enabled to review data that has been harvested. For example, the data harvesting log 334 may include a recording from the time period during which Social App 120 accessed the microphone and a user may be able to playback the recording to precisely ascertain what may have been overheard. It should be appreciated that the specific examples provided herein are for explanatory purposes only and are not to be interpreted as limiting of the claims and/or disclosure.

In various implementations, the trust policy implementation module is configured to generate data harvesting reports which may detail data harvested through one or more user telecommunication devices 102. For example, a user may request a data harvesting report from the telecommunications carrier 106 regarding the particular applications installed on the telecommunication devices 102 and may receive a report detailing one or more of: the specific applications which have harvested data; the particular input and output components that data has been harvested from (and by which applications); the specific time periods that such data was harvested; usage rates associated with the harvested data being transmitted (in the event that transmitting the harvested data counted toward a data plan of the user telecommunication devices 102); and records of the specific data that has been harvested for subscriber review (e.g. so that a subscriber can become apprised specifically of what data has been harvested regarding them).

In some embodiments, the memory 326 may store one or more trust policy rules 336 which may include one or more unique trust profiles 338 that are associated with one or more specific user's and/or user telecommunication devices. For example, as discussed in relation to FIG. 1, a unique trust profile 338 may be created for use in relation to one particular device (e.g. Dad's Phone) whereas another different unique trust profile 338 may be created for use in relation to another device (e.g. Child's Phone). In some implementations, a unique trust profile 338 may be associated and used with only a single user telecommunication device, e.g. a single cell phone subscriber may manage her own trust policy rules. In some implementations, a unique trust profile 338 may be associated and used with multiple user telecommunication devices, e.g. a trust policy administrator may manage trust policy rules that are used across all user telecommunication devices used within an organization.

Figure 4:
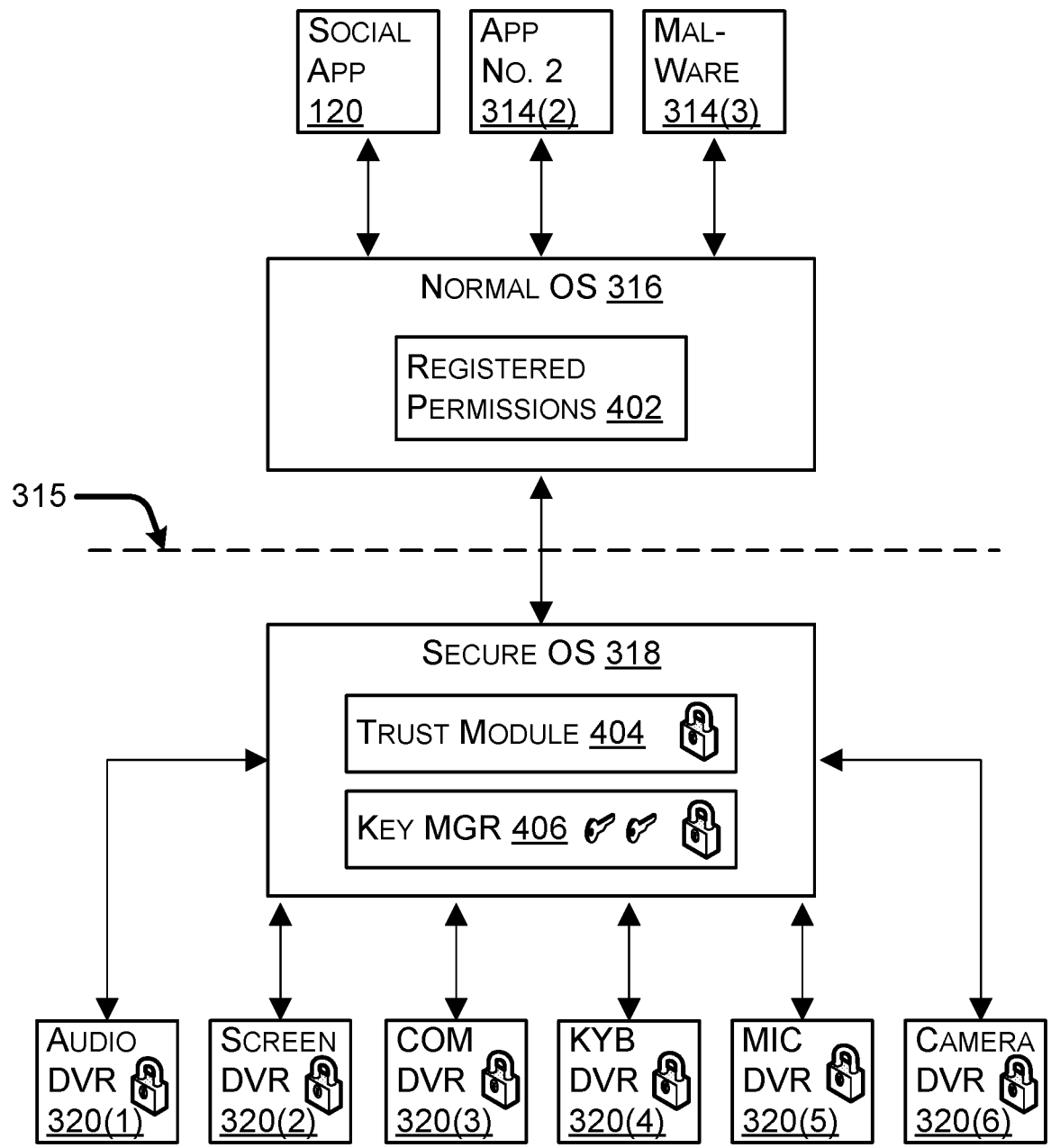
FIG. 4 is an example programming platform of a user telecommunication device having a normal operating system (OS) and a secure OS in communication with one or more hardware drivers, in accordance with embodiments of the disclosure.

FIG. 4 is an example programming platform 400, embodied on a memory 306 of a user telecommunication device, having a normal operating system (OS) 316 and a secure OS 318 in communication with one or more hardware drivers 320(1)-320(6), in accordance with embodiments of the disclosure. As described in relation to FIG. 3, the secure OS 318 may optionally be separated from the normal OS 316 by one or more partitions 315.

In various implementations, the partition 315 may be stored in the user telecommunication device's 302 memory 306, or alternatively, within a separate, dedicated secure OS memory. Similarly, the secure OS 318 may also be configured to operate with a dedicated secure OS processor which can allow the secure OS 318 to operate independent from the user device's 302 normal OS 316, including its processor(s) 304, memory 306, and any input/output components which are not configured to be driven solely by the secure OS 318. In some embodiments, the secure OS may be at least partially embodied on one or more firmware components of the telecommunications device.

In an embodiment, the normal OS 316 may include registered permissions 402, associated with one or more applications 314, that detail which input/output components 310 the applications 314 are permitted to access. For example, the registered permissions 402 may indicate that Social App 120 is permitted to access a microphone driver 320(5) and a camera driver 320(6). Accordingly, the normal OS 316 may allow for Social App 120 to access each of the microphone driver 320(5) and a camera driver 320(6) by issuing an application programming interface (API) call. The registered permissions 402 may have been granted to Social App 120 upon installation despite a user being unaware that such permissions were granted. For example, by accepting a terms of service agreement and/or an end user license agreement for a particular application, a user may grant, knowingly or unknowingly, registered permissions to the application that enable the application to access various input/output components. Furthermore, because many applications require frequent updates and users may become accustomed to allowing for such updates to be installed (typically without reading or even skimming an associated end user license agreement), there may be frequent opportunities for any given application to request and obtain registered permissions during an update process.

In some embodiments, the secure OS 318 may include a trust policy implementation module 404 for managing access to one or more of the input/output components 310. The trust policy implementation module 404 may be configured to execute the trust policy 336 in a manner which overrides the registered permissions 402. For example, in the event that the normal OS 316 allows for Social App 120 to issue an API call to the microphone driver 320(5) and the camera driver 320(6) based on the Social App 120 having registered permissions to do so, the API call may be routed through the trust implementation module 404 which may conditionally prevent Social App 120 from accessing the drivers 320(5) and 320(6) based on the trust policy 336. In various implementations, the programming platform 400 is configured to route all communications between any applications 314 being operated on the normal OS 316 and any input/output components 310 (and/or input/output drivers 320) through the secure OS 318.

In some embodiments, the secure OS 318 may include a key management module 406 for managing one or more cryptographic keys. In some implementations, the key management module 406 obtains keys from the policy server 322 and relays the keys to the trust policy implementation module 404 for encrypting data produced by one or more of the input/output components 310 prior to that data being transmitted across the partition 315 to the normal OS. For example, Social App 120 may have both registered permissions 402 and permissions within the trust policy 336 to access the microphone driver 320(5) and therefore may be permitted to access the microphone driver 320(5). However, in some implementations any data produced by the microphone driver 320(5) may be immediately encrypted so that the data is not susceptible to eavesdropping while the data is transmitted from the secure OS 318 to Social App 120 at the normal OS 316. In some implementations, a key is provided to a requesting application at the normal OS 316 to decrypt data once it is received by the application. In various implementations, the key management module 406 is configured to receive a first asymmetric cryptographic key from the trust policy server 322 for the trust policy implementation module 404 to encrypt data before the data is transferred to an application at the normal OS 316 whereas a second asymmetric cryptographic key, for decrypting the data, is transmitted by the trust policy server 322 directly to a source of the application, e.g. an entity which owns and operates the application. For example, the first and second asymmetric cryptographic keys never coexist on a user telecommunication device for the purpose of decreasing the risk of an unintended recipient of the data from being capable of decrypting the data. It should be appreciated that in such an implementation, certain data produced by one or more of the input/output components 310 might never exist at the normal OS 316 in unencrypted form.

In some implementations, the trust policy implementation module 404 may be configured to cause one or more applications to be uninstalled from the memory 326 of the user telecommunication device 302. Accordingly, the trust policy implementation module 404 may receive a notification, e.g. from a telecommunication carrier, that a source of an attempt to access an input/output component 310 is flagged as a malicious data harvester, e.g. an application that covertly harvests data associated with users of telecommunication devices. Upon receiving such a notification, the trust policy implementation module 404 may cause the application to be uninstalled entirely from the memory 306. For example, Malware 314(3) may be an application that was covertly installed onto the memory 306 by inviting a user to click on an email link seemingly unrelated to Malware 314(3). Later, the user may be unaware that Malware 314(3) is operating whatsoever and Malware may be known to have no legitimate purpose, e.g. no purpose that a typical user would permit on their device. Accordingly, rather than allowing Malware to continually attempt to access device resources, the trust policy implementation module may cause Malware 314(3) to be uninstalled with or without notifying the user.

In various implementations, the trust policy implementation module 404 may be configured to receive an instruction from the telecommunications carrier 106 to disable one or more device components, e.g. an input component or an output component. For example, a user with administrative authority may log into the web portal 118 and instruct that one or more particular components of one or more specified telecommunication devices 102 be disabled. Furthermore, the instruction to disable the device component(s) may be contingent upon one or more selected criteria including but not limited to: a predetermined temporal range (e.g. a specified beginning date and time and a specified ending date and time); a predetermined geographical area that a user of the device resides within (e.g. disable the device upon the location determining component indicating that the device has entered a specified geographical boundary); and/or a predetermined special boundary (e.g. a three-dimensional boundary defined by a particular volume of space). For example, a user may specify that a device component is to be disabled from May 11, 2015 at 2 pm to May 11, 2015 at 3 pm which corresponds to a meeting in which highly sensitive data may be disclosed. Furthermore, a user may specify that the device component is to be disabled if it is detected by one or more sensors that the user telecommunication device has entered a particular room within a business complex or government facility.

It should be appreciated that while various implementations and features have been described in relation to the software applications of Social App 120 and Malware 314(3) and the input/output components of a microphone and a camera, these examples have been provided for explanatory purposes only. Accordingly, any other type application, e.g. App No. 2 314(2) which is not described in detail herein, and/or any other type of input/output component may be applicable to and/or used in conjunction with the present disclosure. for example, as shown in FIG. 4 one or more of an audio output driver 320(1), a screen output driver 320(2), a communication link input/output driver 320(3), a keyboard input driver 320(4), a microphone input driver 320(5), a camera input driver 320(6), or any combination thereof, may be used in conjunction with the present disclosure.

Figure 5:
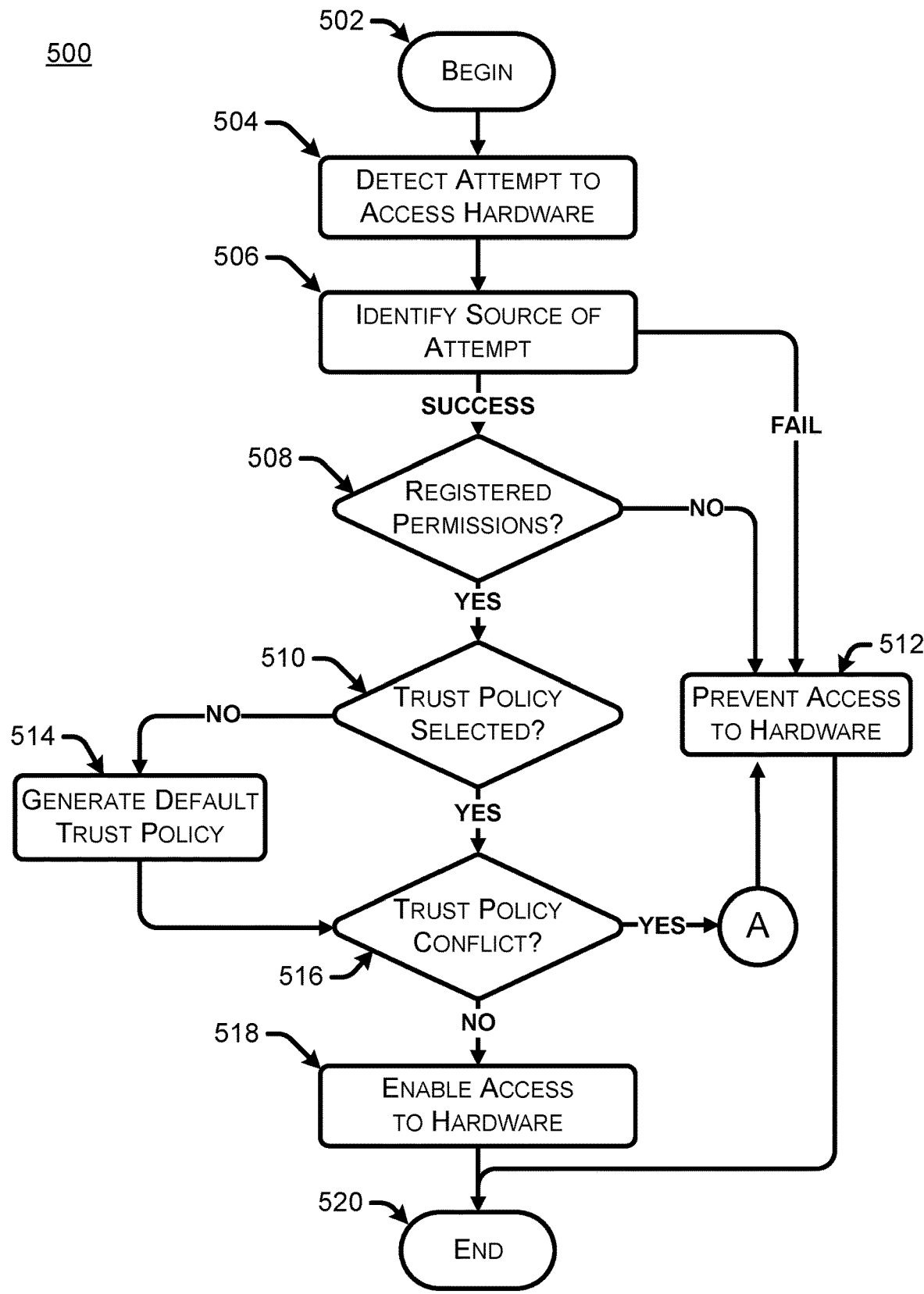
FIG. 5 is a flow chart of an example process for implementing a trust policy for managing application access to device resources by overriding registered permissions, in accordance with embodiments of the disclosure.

FIG. 5 is a flow chart of an example process 500 for implementing a trust policy for managing application access to device resources by overriding registered permissions, in accordance with embodiments of the disclosure. The flow process beings as block 502, such as in response to a device power-on or reboot event after which a device may standby until proceeding to the next block. Next, at block 504, an attempt by an application 314 to access one or more hardware components of the user telecommunication device 302 is detected. In various implementations, the attempt may be detected by the trust policy implementation module 404 which manages access to the one or more hardware components of the device 302. In various implementations, the access attempt is detected indirectly via detecting access to one or more drivers of the hardware components.

Next, at block 506, a source of the access attempt is identified such as, for example, by identifying the particular application which has issued an API call to a device driver and/or by identifying the particular entity which provided the application to the user telecommunication device 302. In some implementations, in the event that the source of the attempt is unidentifiable, e.g. an application is designed to operate covertly and/or conceal its identity, the process may proceed directly to block 512 to prevent the application from accessing the hardware component, e.g. an input/output component 310. In some implementations, in the event that the source of the attempt is successfully identified, the process proceeds to decision block 508 to determine whether the source of the attempt (or an application that the source has provided to the user device 302) has registered permissions 402 to access the hardware component (or other device resource). In various embodiments, the trust policy implementation module 336 may be programmed to perform the determination at block 508.

In a scenario where the source is determined not to have registered permissions to access the hardware component, the process proceeds to block 512 where the access to the hardware component is prevented. In a scenario where the source is determined to have registered permissions, the process proceeds to decision block 510 to determine whether a trust policy has been selected in relation to the source that was identified at block 506. As described above, the trust policy may have been selected by a user, e.g. through the trust policy management interface 112 described above. In some implementations, if a trust policy has not been selected in relation to the source, e.g. no trust policy rules have been selected with regard to the particular source of the current attempt to access device hardware, then the process proceeds to block 514 at which a default trust policy is generated. The default trust policy may be created by the telecommunications carrier 106 and stored on the trust policy server 116. For example, a default trust policy for Malware 314(3) may be set by the telecommunications carrier to automatically prevent Malware from accessing any hardware despite Malware having been able to covertly obtain registered permissions to access one or more hardware components. In various implementations, the default trust policy is set by a user. For example, a user may set the default trust policy to always deny access until the user affirmatively updates the default trust policy to allow access for a specifically user specified application. In various implementations, the default trust policy may be at least partially set by a telecommunications carrier based on specific knowledge regarding particular applications. For example, a telecommunications carrier may partner with one or more sources of specific applications and may set the default trust policy on behalf its subscribers after a detailed analysis of the programming functions of the specific applications and the trustworthiness of the sources.

Following block 514 or 510, the process 500 proceeds to decision block 516 at which a determination is made as to whether the trust policy conflicts with the registered permissions such that the trust policy is set to prevent access, by the source, to the hardware component. In a scenario where it is determined that the trust policy does not conflict with the registered permissions, e.g. both the registered permissions and the trust policy are set to permit the source to access the hardware, then the process proceeds to block 518 at which the source is enabled to access the hardware. For example, the trust policy implementation module 404 may route an API call to one or more of the drivers 320(1)-320(6) of FIG. 4. As discussed above, the trust policy implementation module 404 may optionally encrypt any data produced by the hardware to which access has been enabled. In a scenario where it is determined that the trust policy does conflict with the registered permissions, e.g. the trust policy is set to block access despite the source application having registered permissions, then the process proceeds to block 512 at which access by the source to the hardware component is prevented. Then, the flow process ends at block 520.

Figure 6:
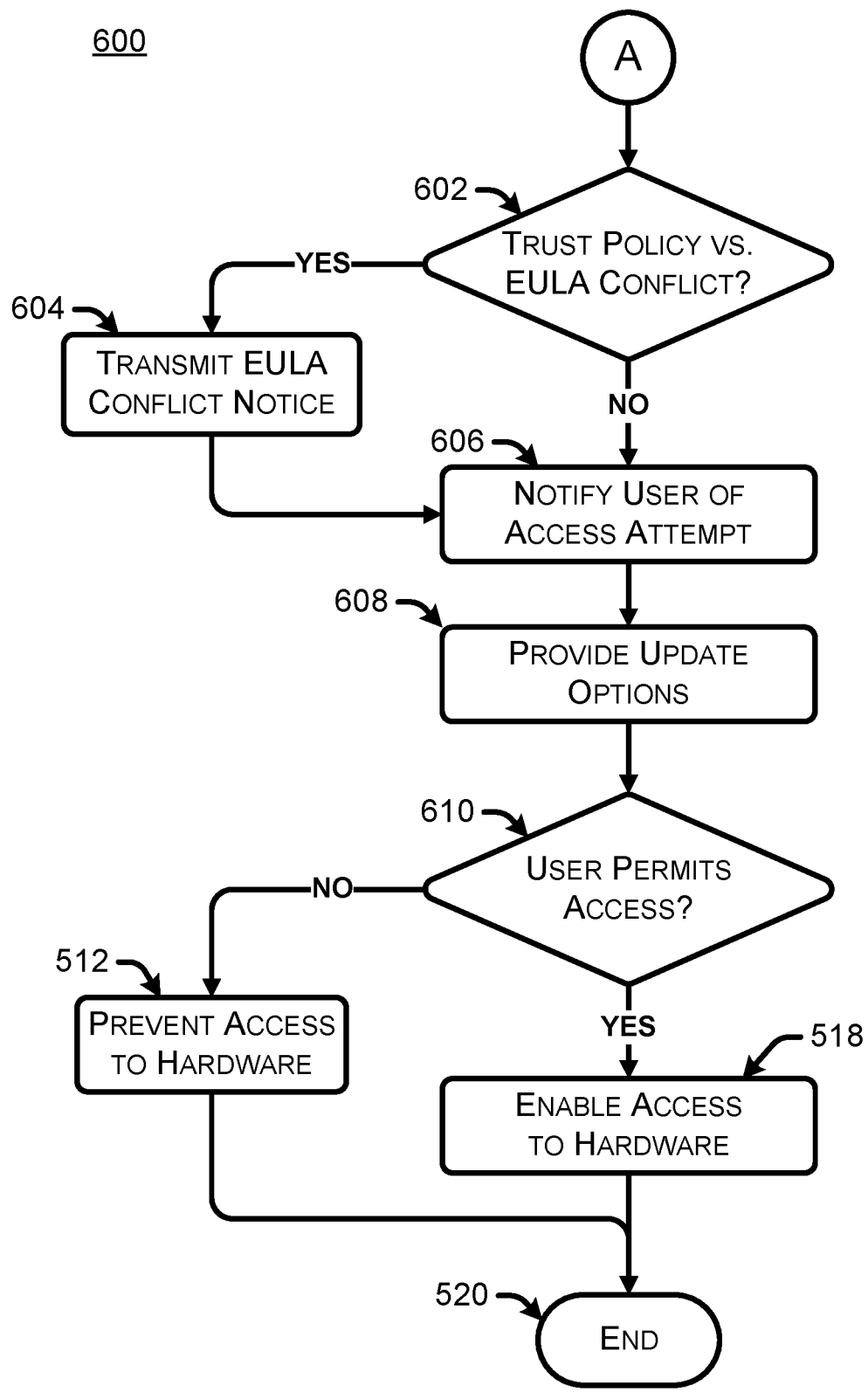
FIG. 6 is a flow chart of an example process for notifying an entity that a trust policy is in conflict with an end user license agreement, in accordance with embodiments of the disclosure.

FIG. 6 is a flow chart of an example process for notifying an entity that a trust policy is in conflict with an end user license agreement, in accordance with embodiments of the disclosure. The process steps of FIG. 6 may be optionally used in conjunction with the process steps of FIG. 5. For example, in some implementations, the process steps of FIG. 6 may begin at location A of FIG. 5 whereas in other implementations the process of FIG. 5 may proceed uninterruptedly from decision block 516 to block 512. Accordingly, in some implementations the process 600 may proceed from block 516 to block 602 following a determination that the trust policy does conflict with the registered permissions 402.

At decision block 602, a determination is made as to whether the trust policy 336 (which may have been deemed to conflict with the registered permissions 402) conflicts with one or more terms of an end user license agreement (EULA). For example, the source of the attempt to access a hardware component of the user telecommunications device may have included in a EULA a provision stating that by installing an application, e.g. Social App 120, an end user is agreeing to allow Social App 120 to access a microphone of the user telecommunications device. Accordingly, the source of Social App 120 may wish to be informed if end users are implementing a trust policy which breaches the EULA. In a scenario where it is determined that the trust policy does conflict with the EULA, the process 600 may proceed to block 604 at which a notification of the conflict between the EULA and the trust policy is transmitted to one or more entities, e.g. an end user and/or a source of the access attempt detected at block 504. In a scenario where it is determined that the trust policy does not conflict the EULA, the process 600 may proceed to block 606 at which a notification of the access attempt is sent to a telecommunications device user. For example, the notification of FIG. 2 may be displayed to a user in response to Social App attempting to access the microphone.

Next, the process may optionally proceed to block 608 at which one or more options are provided in relation to updating the trust policy 336. For example, a user may be presented with an option to update the trust policy to allow the source to access the particular hardware component that the source has attempted to access. The process 600 may then proceed to decision block 610 at which a determination is made as to whether the user has selected an option to permit the source to access the particular hardware device requested. In a scenario wherein the user elects to permit access, the process 600 may proceed to block 518 at which the source is enabled to access the hardware. Alternatively, in a scenario wherein the user does not elect to permit access, the process 600 may proceed to block 512 to prevent the source from achieving the attempted access. Then, the flow process ends at block 520.

It should be appreciated that blocks 602 and 604 may or may not be performed in conjunction with blocks 606-610.

Accordingly, in an implementation wherein blocks 602 and 604 are omitted, the process may proceed directly from block 516 to block 606.

What is claimed is:

1. A method comprising:
receiving, by a secure operating system of a telecommunication device, a communication routed through the secure operating system, wherein the communication is associated with:
an application executing on the telecommunication device via a second operating system partitioned from the secure operating system, and
an input/output (I/O) component of the telecommunication device;
determining, by the secure operating system, that the communication is associated with an attempt to access the I/O component of the telecommunication device by the application;
determining, by the secure operating system, that a registered permission of the second operating system of the telecommunication device indicates that the second operating system has granted the application permission to access the I/O component of the telecommunication device;
determining, by the secure operating system, that a trust policy associated with the application conflicts with the registered permission of the second operating system, based on:
the registered permission indicating that the second operating system has granted the application permission to access the I/O component; and
the trust policy indicating that the application is not permitted access to the I/O component; and
preventing, by the secure operating system, the application from sending data to, or receiving data from, the I/O component in response to the attempt, based on the determining that the trust policy conflicts with the registered permission.

2. The method of claim 1, wherein the trust policy reflects privacy criteria selected by a user through a user interface.

3. The method of claim 2, wherein the user interface is configured to allow the user to select different privacy criteria for at least one of different applications or different telecommunication devices associated with the user.

4. The method of claim 1, wherein the trust policy is based at least in part on malicious application data stored at a policy server.

5. The method of claim 1, wherein the telecommunication device receives the trust policy from a policy server.

6. The method of claim 1, wherein the communication is an application programming interface (API) call from the application to a driver for the I/O component.

7. The method of claim 1, further comprising displaying, by the telecommunication device, a notification indicating that the application is being prevented from sending data to or receiving data from the I/O component based on the determining that the trust policy conflicts with the registered permission.

8. The method of claim 7, wherein the notification includes one or more selectable options for confirming or modifying the trust policy.

9. The method of claim 1, wherein the registered permission was created during installation of the application.

10. The method of claim 1, wherein the trust policy conditionally denies access to the I/O component to the application based on at least one of temporal or geographical criteria.

11. A telecommunication device, comprising:
one or more processors;
an input/output (I/O) component;
memory storing a secure operating system partitioned from a second operating system, the memory further storing computer-executable instructions that, when executed by the one or more processors, cause the secure operating system to:
 detect an attempt to access the I/O component by an application on the telecommunication device;
 determine that a registered permission of the second operating system of the telecommunication device indicates that the second operating system has granted the application permission to access the I/O component;
 determine that a trust policy associated with the application conflicts with the registered permission of the second operating system, based on:
  the registered permission indicating that the second operating system has granted the application permission to access the I/O component; and
  the trust policy indicating that the application is not permitted access to the I/O component; and
 prevent the application from sending data to, or receiving data from, the I/O component in response to the attempt, based on determining that the trust policy conflicts with the registered permission.

12. The telecommunication device of claim 11, wherein the trust policy reflects privacy criteria selected by a user through a user interface.

13. The telecommunication device of claim 11, wherein the telecommunication device receives the trust policy from a policy server.

14. A method comprising:
 detecting, by a secure operating system of a telecommunication device that is partitioned from a second operating system of the telecommunication device, an attempt by an application to access an input/output (I/O) component of the telecommunication device, wherein the application executes on the telecommunication device in association with the second operating system;
 determining, by the secure operating system, that a trust policy associated with the application:
  does not grant the application access to the I/O component, and
  overrides a registered permission of the second operating system that would grant the application access to the I/O component; and
 preventing, by the secure operating system, the application from sending data to or receiving data from the I/O component in response to the attempt, based on determining that the trust policy does not grant access to the I/O component to the application.

15. The method of claim 14, wherein the trust policy reflects privacy criteria selected by a user through a user interface.

16. The method of claim 14, wherein the trust policy is based at least in part on malicious application data stored at a policy server.

17. The method of claim 14, wherein the secure operating system detects the attempt based at least in part on receiving an application programming interface (API) call from the application to a driver for the I/O component.

18. The method of claim 17, wherein the secure operating system prevents the application from sending data to or receiving data from the I/O component by preventing the application from accessing the driver for the I/O component.

19. The telecommunication device of claim 11, wherein the secure operating system detects the attempt based at least in part on receiving an application programming interface (API) call from the application to a driver for the I/O component.

20. The telecommunication device of claim 11, wherein the computer-executable instructions further cause the telecommunication device to display a notification indicating that the application is being prevented from sending data to, or receiving data from, the I/O component based on the determining that the trust policy conflicts with the registered permission.

* * * * *